H. G. WETHALL.
FLOATING DECOY.
APPLICATION FILED JAN. 10, 1910.
970,003.
Patented Sept. 13, 1910.
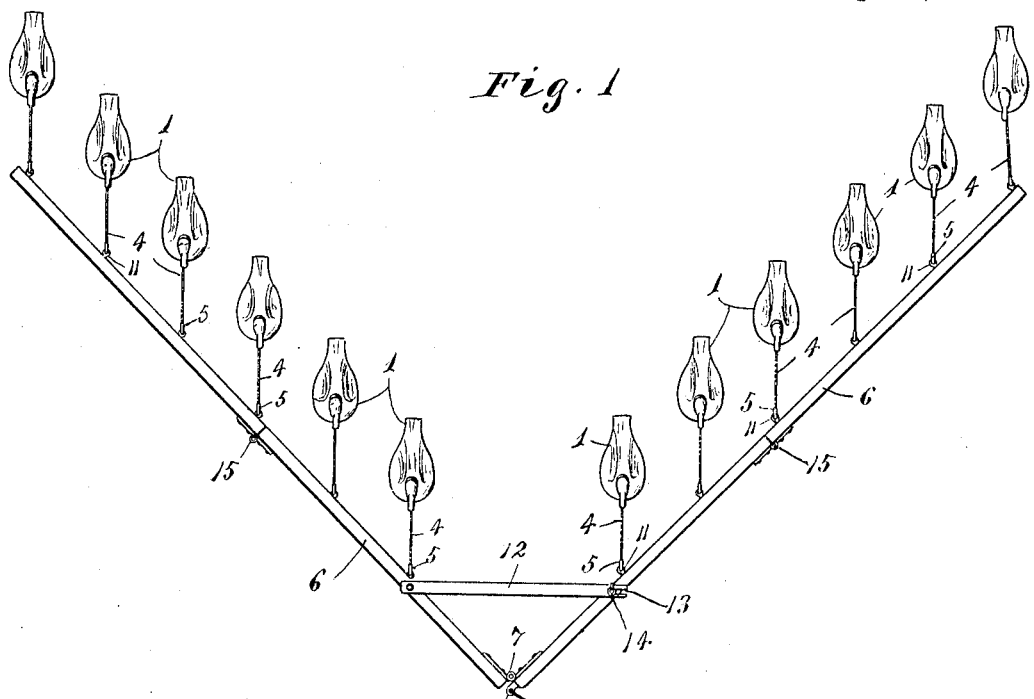
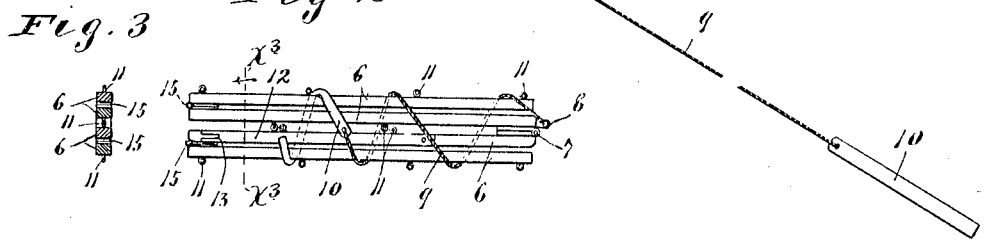
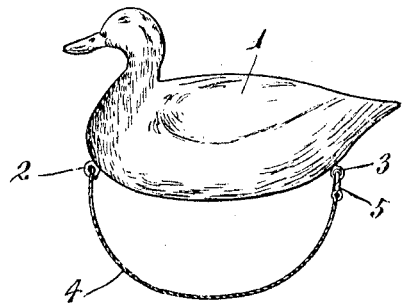
Witnesses.
A. H. Opsahl.
W. H. Souba.
Inventor.
Hans. G. Wethall.
By his Attorneys
Williamson & Merchant

UNITED STATES PATENT OFFICE.

HANS G. WETHALL, OF MINNEAPOLIS, MINNESOTA, ASSIGNOR OF ONE-HALF TO BERNARD J. DAHL, OF MINNEAPOLIS, MINNESOTA.

FLOATING DECOY.

970,003.     Specification of Letters Patent.     Patented Sept. 13, 1910.

Application filed January 10, 1910. Serial No. 537,160.

*To all whom it may concern:*

Be it known that I, HANS G. WETHALL, a citizen of the United States, residing at Minneapolis, in the county of Hennepin and State of Minnesota, have invented certain new and useful Improvements in Floating Decoys; and I do hereby declare the following to be a full, clear, and exact description of the invention, such as will enable others skilled in the art to which it appertains to make and use the same.

My invention has for its object to provide an improved floating decoy kit adapted to be quickly and easily folded into small and compact form, for the purpose of storage or transportation, and adapted to be very quickly spread out on water for use in hunting ducks and similar wild birds.

To the above ends, the invention consists of the novel devices and combinations of devices hereinafter described and defined in the claims.

In the accompanying drawings, which illustrate the invention, like characters indicate like parts throughout the several views.

Referring to the drawings, Figure 1 is a plan view showing the device spread out in condition for use; Fig. 2 shows the framework of the device folded; Fig. 3 is a section taken on the line $x^3$ $x^3$ of Fig. 2; and Fig. 4 is a detail view in side elevation, showing one of the decoy ducks detached from the rest of the device.

The decoy ducks are individually indicated by the numeral 1. Each duck is provided, at its lower portion, with a front eye 2 and a rear eye 3, to the former of which a short drag line 4 is permanently attached, the said line, at its free end, having a snap hook 5 adapted to be applied to the eye 3, thereby forming a sort of a bail by means of which a large number of decoy ducks may be carried in the hand or on the arm.

The supporting or spreading frame of the device is preferably made up of a pair of wooden drag bars 6 connected, at their front ends, by a hinge 7 and one thereof having a perforated lug 8 to which an anchoring line or cable 9 is attached at one end. To the other end of the anchoring line 9 is attached an anchor 10, which is preferably in the form of a long piece of soft lead. The drag bars 6 are provided with devices such as screw eyes 11, to which the snap hooks 5 of the individual drag lines 4 may be attached when the drag bars are spread out, as shown in Fig. 1. To hold the drag bars, the drag bars 6 are adapted to be held in their spread or diverging positions, shown in said Fig. 1, by means of a spreader bar 12 which, as shown, is pivoted at one end to one of the drag bars 6 and at its other end is provided with a slot 13 adapting it to be detachably secured to the other drag bar by a thumb nut equipped bolt 14 or other suitable device.

The drag bars 6 are preferably made long enough to each properly space about six decoy ducks and, to enable the said bars to be folded and in compact form, each is provided with an intermediate joint connected by a hinge 15. The hinges 15 adapt the bars 6 to be folded in a forwardly direction, but prevent folding movements thereof in a reverse direction, so that when the bars are spread out, as shown in Fig. 1, they will remain extended or in straight positions.

This improved decoy kit is adapted to be set up for use and anchored in a very few minutes and it holds the decoy ducks in a very natural V-shaped formation and permits limited independent lateral movements of the decoy ducks, all of which adds very materially to the natural appearance of the decoy. To set up a number of individual and independent decoys of a number equal to that shown in Fig. 1, as has hitherto been customary, requires considerable time and frequently considerable trouble to properly position the decoys. Also, the collection of the individually set decoys has been found to require considerable time. With my improved decoy kit, the setting of the decoys and the collection of the decoys becomes a very simple and easy matter.

When the framework of the device is folded, as shown in Figs. 2 and 3, the decoys are detached therefrom and the anchor line 9 may readily be wound around the folded framework and the flexible anchor 10 bent around the said folded framework, thereby securing the framework together, as shown in Figs. 2 and 3.

The entire device is of comparatively small cost and decoy ducks of any suitable character may be used in connection therewith.

What I claim is:

1. In a floating decoy kit, the combination with diverging drag bars connected by a hinge at their front ends and made up of hinge sections, of a spreader bar pivoted to one of said drag bars and detachably connected to the other drag bar, an anchor having an anchor line connected to the front end of said drag bars, a multiplicity of eyes on said drag bars, and a multiplicity of decoys provided with drag lines having snap hooks at their free ends adapted for application to the eyes of said drag bars, substantially as described.

2. In a floating decoy kit, the combination with diverging drag bars connected by a hinge at their front ends and made up of hinge sections, of a spreader bar pivoted to one of said drag bars and detachably connected to the other drag bar, an anchor having an anchor line connected to the front end of said drag bars, the said anchor being of long and flexible material adapting it to be bent around said drag bars when the latter are folded, a multiplicity of eyes on said drag bars, and a multiplicity of decoys provided with drag lines having snap hooks at their free ends adapted for application to the eyes of said drag bars, substantially as described.

3. In a floating decoy kit, the combination with a drag bar having a multiplicity of longitudinally spaced eyes, of a multiplicity of decoys having individual drag lines provided at their free ends with snap hooks adapting them for application to said eyes, substantially as described.

In testimony whereof I affix my signature in presence of two witnesses.

HANS G. WETHALL.

Witnesses:
A. H. OPSAHL,
F. D. MERCHANT.